US011999605B2

(12) United States Patent
Cluesserath

(10) Patent No.: US 11,999,605 B2
(45) Date of Patent: Jun. 4, 2024

(54) METHOD FOR FILLING AND CLOSING CONTAINERS

(71) Applicant: KHS GMBH, Dortmund (DE)

(72) Inventor: Ludwig Cluesserath, Bad Kreuznach (DE)

(73) Assignee: KHS GmbH, Dortmund (DE)

(*) Notice: Subject to any disclaimer, the term of this patent is extended or adjusted under 35 U.S.C. 154(b) by 206 days.

(21) Appl. No.: 17/775,359

(22) PCT Filed: Nov. 5, 2020

(86) PCT No.: PCT/EP2020/081028
§ 371 (c)(1),
(2) Date: May 9, 2022

(87) PCT Pub. No.: WO2021/089658
PCT Pub. Date: May 14, 2021

(65) Prior Publication Data
US 2022/0380189 A1 Dec. 1, 2022

(30) Foreign Application Priority Data
Nov. 7, 2019 (DE) ..................... 10 2019 130 052.5

(51) Int. Cl.

| | |
|---|---|
| ***B67C 3/10*** | (2006.01) |
| ***B67C 3/00*** | (2006.01) |
| ***B67C 3/26*** | (2006.01) |
| ***B67C 7/00*** | (2006.01) |

(52) U.S. Cl.
CPC ................ *B67C 3/10* (2013.01); *B67C 3/007* (2013.01); *B67C 3/2631* (2013.01); *B67C 7/00* (2013.01); *B67C 2003/2697* (2013.01)

(58) Field of Classification Search
CPC ......... B67C 3/007; B67C 3/10; B67C 3/2631; B67C 7/00; B67C 2003/2697
See application file for complete search history.

(56) References Cited

U.S. PATENT DOCUMENTS

| | | | | |
|---|---|---|---|---|
| 8,726,946 | B2 * | 5/2014 | Clusserath | B67C 3/10 141/59 |
| 9,856,125 | B2 * | 1/2018 | Clüsserath | B67C 3/2617 |
| 9,862,584 | B2 * | 1/2018 | Clüsserath | B08B 9/20 |
| 10,040,677 | B2 * | 8/2018 | Clüsserath | B67C 3/007 |
| 10,294,090 | B2 * | 5/2019 | Clüsserath | B67C 3/2628 |
| 10,696,433 | B2 * | 6/2020 | Clüsserath | B65B 3/10 |

(Continued)

FOREIGN PATENT DOCUMENTS

| | | | |
|---|---|---|---|
| DE | 102014104873 | A1 | 10/2015 |
| DE | 102016108502 | A1 | 11/2017 |

(Continued)

*Primary Examiner* — Thomas M Wittenschlaeger

(74) *Attorney, Agent, or Firm* — Laurence A. Greenberg; Werner H. Stemer; Ralph E. Locher

(57) ABSTRACT

A method for filling and closing containers at a filling and closing unit of a handling station. After the completion of a filling phase, a handling phase is carried out at the filling and closing unit of the handling station, in which the process chamber is pre-loaded, in particular above the container opening of the corresponding container, by way of nitrogen to a pressure which is at or above the saturation pressure of the $CO_2$ contained in the filling material.

17 Claims, 9 Drawing Sheets

(56) References Cited

U.S. PATENT DOCUMENTS

| | | | | |
|---|---|---|---|---|
| 10,836,622 | B2 | 11/2020 | Meinzinger | |
| 11,345,073 | B2 * | 5/2022 | Clüsserath | B65B 55/08 |
| 11,608,257 | B2 * | 3/2023 | Clüsserath | B67C 3/007 |
| 11,795,045 | B2 * | 10/2023 | Krulitsch | B67C 3/283 |
| 2002/0139434 | A1 * | 10/2002 | Meheen | B67C 3/10 141/59 |
| 2015/0284234 | A1 * | 10/2015 | Meinzinger | B67C 3/10 141/59 |
| 2019/0071295 | A1 | 3/2019 | Cluesserath | |
| 2019/0077647 | A1 * | 3/2019 | Boscaro | B67C 3/262 |
| 2019/0106311 | A1 * | 4/2019 | Habersetzer | B67C 7/00 |
| 2019/0330038 | A1 * | 10/2019 | Melrose | B65B 7/2835 |
| 2021/0053811 | A1 | 2/2021 | Linke et al. | |

FOREIGN PATENT DOCUMENTS

| | | | |
|---|---|---|---|
| DE | 102018108760 | A1 | 10/2019 |
| WO | 2017135902 | A1 | 8/2017 |

* cited by examiner

METHOD FOR FILLING AND CLOSING CONTAINERS

FIELD AND BACKGROUND OF THE INVENTION

The invention relates to a method for filling containers with a liquid filling material and for closing the containers with a closing cover, in particular a crown cork.

The invention relates to a method for a container handing system, such as may be used in container handling machines in the beverage industry, in particular container handling machines with capacities of more than 1000 containers per hour, in particular container handling machines with a capacity of more than 10000 containers per hour. In particular, the invention relates to a method for a container handling system which comprises what is referred to as a filling machine or filler for the filling of containers with liquid filling material. The invention also relates to container handling systems for the filling of containers which simultaneously comprise the function of a closer for closing filled containers, and in this situation is configured in particular for the closing of filled containers with a closure cover, such as, for example, crown corks.

Filling machines of the type referred to may be provided with a large number of handling stations or handling positions, which can also be understood as filling stations or filling positions. Provided at each filling station of the filling machine is a filling element or filling body, with a filling valve or fluid valve, by way of the dispensing opening of which the liquid filling material is discharged into the container. For example, the dispensing of the filling material into the containers can take place by means of what is referred to as “free jet filling”.

With the framework of the present invention, “free jet filling” is understood to mean a filling method with which the liquid material flows into the container which is to be filled from the fluid valve in a free filling jet or filling material jet, wherein the flow of the filling material is not influenced or changed by guide elements, such as deflection screens, swirl bodies, or short or long filling tubes. Free jet filling can take place without pressure as well as under pressure. With free jet filling without pressure, the container exhibits ambient pressure, wherein, as a rule, the container is not in contact with its container mouth or opening at the filling element, but is located at a distance from the filling element or from a dispensing opening provided. However, if, with free jet filling without pressure, the container is in fact in contact with its container mouth at the filling element, then a gas path provides a connection between the interior of the container and the surrounding environment, as a result of which filling without pressure is made possible. Preferably, by means of this gas path, any gas held in the container, and gas displaced by the beverage flowing into the container, also escapes by way of this gas path into the surrounding environment.

If the free jet filling takes place under a pressure which deviates from ambient pressure, the container is then pressed with its mouth against the filling element and sealed in place. By means of the imposition of a pre-loading gas or the imposition of a negative pressure, the pressure in the interior of the container is adjusted to a pressure which may correspond to the ambient pressure or may also deviate from it. The pressure which is set may be above as well as below the ambient pressure.

As a rule, closing devices or closers of the type referred to are likewise provided with a plurality of handling stations or positions, which can also be understood as closing stations or closing positions. Provided at each closing station of the closer is a closing body or closing tool, with a closing punch, by means of which a crown cork is pressed onto the container mouth and finally secured with sealing effect by way of deformation.

From the prior art, namely from DE 10 2014 104 873 A1, a container handling system for a beverage filling process is known, with which a beverage containing $CO_2$ is filled into an evacuated container, in particular a bottle. With this filling into the evacuated container, the filling process takes place extremely rapidly, at very high speed, as a result of which it is not possible for the pressure in the container to be brought to ambient pressure close to simultaneously, and/or for the container to be drawn away from the filling position, since this would inevitably lead to excessive foaming of the filling material. With this known method, therefore, the filling process is combined with the closing process directly at the filling position.

In this situation, the closing process takes place in a closed gas chamber above the bottle and at a pressure above the $CO_2$ saturation pressure. With this known method, provision is likewise made for the container which is to be filled to be flushed with an inert flushing gas before the actual evacuation.

For both the flushing of the containers during a flushing phase, as well as for the introducing of a stressing gas after the filling phase, with the known method $CO_2$ is used as the inert gas. In this situation, the use of $CO_2$ is not only expensive, but, more especially, its use is increasingly becoming the focus of environmental discussion in the political and economic spheres. $CO_2$ is an important constituent part of the global carbon cycle, and, as a natural constituent of air, is a significant greenhouse gas in the earth’s atmosphere. Since the beginning of industrialisation, however, human activities have caused its proportion in the earth’s atmosphere to increase substantially. This increase is causing an intensification of the greenhouse effect, which in turn is viewed as a cause of current global warming.

SUMMARY OF THE INVENTION

Taking this as a basis, the object of the invention is to provide a method for both filling containers with a liquid filling material as well as for closing the containers with a closure cover, with which the use of $CO_2$ can be largely avoided.

The object is solved by a method for filling and closing containers at a filling and closing unit in accordance with the features as claimed. In this situation, the dependent claims relate to particularly advantageous further embodiments of the invention.

According to one important aspect, the invention relates to a method for filling and closing containers at a filling and closing unit of a handling station, with which a container mouth of a corresponding container is connected pressure-tight to a process chamber of the filling and closing unit.

In this situation, before the initiating of a filling phase, at least the interior of the container arranged in the sealing position at the process chamber is evacuated, in an evacuation phase, initially at least once to a negative pressure of preferably 0.05 to 0.15 residual pressure, and then, in at least one flushing phase, is flushed with steam and/or flushing gas containing steam in such a way that, before the opening of the filling valve for filling the container with the liquid filling material, the flushing gas pressure in the container is increased to at least atmospheric pressure.

Moreover, in the actual filling phase the filling valve is opened, such that the liquid filling material flows into the container, which continues to be arranged in the sealing position at the filling and closing unit.

After the ending of the filling phase, a handling phase is carried out at the filling and closing unit of the handling station, in which the process chamber is pre-stressed, in particular above the container mouth of the corresponding container, by means of nitrogen, to the pressure of the $CO_2$ saturation pressure of the $CO_2$ contained in the filling material being filled, or above.

After this handling phase, the container, still at the filling and closing unit of the handling station, is closed by pressing the closing cover under the pressure conditions set during the handling phase, before the internal pressure of the process chamber is reduced to atmospheric pressure and the pressure-tight connection is released between the container mouth of the corresponding container and the process chamber.

It is therefore advantageous with the filling method according to the invention that no additional $CO_2$ is necessary for the filling process, since, instead of that, nitrogen (designated in the chemical formula by $N_2$) is used for imposing in the head space of the container and/or of the handling chamber after the filling of the container. In this way, no environmentally harmful emission gas is released during the filling. $N_2$ can be obtained in the filling system from the ambient air, and the steam used during the flushing phase can be produced by the use of regenerative energy sources.

Moreover, with the method according to the invention, after the ending of the filling process and the release of the container mouth and before the closing process, the beverage is held in the container by an $N_2$ overpressure, which preferably lies slightly above the saturation pressure of the $CO_2$ contained in the filling material which has been filled, wherein the over-foaming of the filling material is also reliably prevented.

The $N_2$ atmosphere additionally reliably prevents the penetration of oxygen into the process chamber until the respective container is closed directly at or in the handling station. Accordingly, a method is provided for the filling of containers with a liquid filling material and also for the closing of containers with a closure cover, with which (method) the use of $CO_2$ is substantially reduced in comparison with the prior art, or even entirely eliminated.

The method according to the invention makes use in principle of the fact that a carbonated beverage, which has been filled into a container by the effect of vacuum or high negative pressure at a very high filling speed, can then be very rapidly relieved of pressure after the ending of the filling process, while an (excessive) foaming of the filling material by an increased ambient pressure is prevented according to the invention by the imposing of $N_2$ on the process chamber.

Due to the very pure steam atmosphere which is produced in the container in the upstream evacuating and flushing phase, in which a beverage is filled with slightly dissolved oxygen portions or other foreign gas portions, during the filling of the liquid filling material in the filling phase only a very limited amount of foam is produced, despite the substantial flow turbulence incurred by the rapid inflow. Accordingly, for example, in a pure steam pressure atmosphere the carbon dioxide initially emerging from the beverage is very rapidly dissolved again in the beverage.

For this purpose, shortly before the opening of the filling valve, in the flushing phase, the steam pressure in the container is increased to atmospheric pressure or a pressure above that. If the filling valve then opens under these conditions in the following filling phase, then, at the inflowing of the cold liquid filling material, a very abrupt condensation will occur of at least a part volume of the steam present in the container. As a result, a very rapid filling of the container will occur. If filling takes place into such an atmosphere with high turbulence, there will initially be a substantial release of $CO_2$, and therefore a transition of $CO_2$ from the liquid phase into the gas phase. As a result of this effect, and the residual gas atmosphere compressed by the inflowing cold filling material, the pressure in the container will rise again. If the pressure in this filling phase exceeds the $CO_2$ saturation pressure, a recarbonating effect will occur with the previously released $CO_2$, i.e. with the increasing pressure rise the $CO_2$ or the carbon dioxide will again be very rapidly dissolved in the beverage, up to the saturation pressure or even above it. As a result, the foam formation produced will be kept within limits. If in this situation only steam is used, then, with the aid of the steam flushing process, an atmosphere can be created in the container which is practically free of residual air (oxygen).

With this method, too, the inflow speed of the filling material into the bottle can be regulated by a combination of flow meter and regulating valve.

Preferably, in particular in the event of a volumetric measurement by flow meter being too slow for the very rapid filling, the filling quantity required of the filling material is metered into a preliminary vessel and then released very rapidly into the bottle. This is advantageous if, due to the high filling speed, the flow meter is no longer capable of attaining an adequate precision of measurement.

The use of steam, in particular superheated steam, as a flushing medium in the flushing phase, has the additional effect that micro-organisms harmful to the beverage will be killed.

The beverage or filling material is preferably filled via a tight-sealed connection between a filling material tank and the container which is to be filled, by means of a switchable filling valve. Preferably, a pressure is set in the gas chamber of the filling material container which corresponds to the $CO_2$ saturation pressure of the liquid filling material which is to be filled, or lies above this.

The method has the advantage that, due to the substantial pressure differential between the filling material tank and the container, the filling process takes place very rapidly. This leads to short filling times, and therefore to perceptibly smaller dimensioned filling machines.

If required, the filling speed can also be regulated by means of a regulating valve arranged in the inlet to the container, as a dependency of the volume flow determined by the flow meter.

With non-carbonated still beverages, the pressure in the storage tank can also be atmospheric pressure, or a pressure which lies slightly above that.

Preferably, use is made of steam or superheated steam as the flushing gas during the evacuation phase and/or during the flushing phase. This has the advantage that, on the one hand, any micro-organisms which may be present in the container before or during the filling will be killed. On the other hand, the steam or superheated steam condenses extremely abruptly during the filling, with the result that essentially a vacuum filling is achieved. This leads to a very rapid filling process.

For this purpose, an overpressure of 0.02 to 0.2, in particular 0.05 to 0.1 bar, can preferably be set in the container after the flushing phase and before the filling phase. This also leads to the situation that, at the stirring of the beverage, the pressure in the container or in the process chamber respectively rises above the saturation pressure of the $CO_2$ contained in the filling material, such that the beverage does not become degassed or foams with interfering effect in the stirring phase.

According to the invention, however, after the ending of the filling phase, a handling phase is carried out at the filling and closing unit of the handling station, in which the process chamber is subjected to nitrogen $N_2$ in particular above the container mouth of the corresponding container and, in this way, pre-stressed to a pressure which corresponds to the saturation pressure of the $CO_2$ contained in the filled filling material or lies above this.

In order to increase the condensation effect in the container still further, provision can additionally be made for the component parts of the filling and closing unit which come in contact with the steam to be made of a material with low thermal conductivity and/or thermal capacity, such that the condensation effect is produced close to exclusively in the container.

According to one advantageous embodiment variant, a method can be provided for in this situation with which the process chamber, with a mixture of nitrogen and atmospheric air, is adjusted to a pressure which corresponds to the saturation pressure of the $CO_2$ contained in the filled filling material or lies above this.

According to one advantageous embodiment variant, a method can be provided for in this situation with which the process chamber is set with pure nitrogen to a pressure which corresponds to the saturation pressure of the $CO_2$ contained in the filled filling material, or lies above this.

According to one advantageous embodiment variant, a method can be provided for in this situation with which the evacuation phase and/or the flushing phase are in each case carried out several times, and specifically by means of an alternating switching backwards and forwards between the evacuation phase and the flushing phase.

According to a further advantageous embodiment variant, provision can be made in this situation that nitrogen is mixed with the flushing gas containing steam in the flushing phase, and preferably in the concluding flushing phase before the initiating of the filling phase.

According to a further advantageous embodiment variant, a method can be provided for in this situation with which at least the evacuation phase and/or the flushing phase and/or the filling phase and/or the handling phase are controlled and/or regulated as a dependency of the actual pressure values detected inside the process chamber by means of at least one pressure sensor. As a result, the duration of the process steps of the evacuation phase and/or the flushing phase and/or the handling phase, in particular the flushing of the container with steam between evacuation phases, the imposing of steam on the container to atmospheric pressure shortly before the initiating of the filling phase, and the imposing of steam on the process chamber and the mouth of the container after the end of filling in the handling phase, can be kept as short as possible by the pressure-dependent switching. In this way the steam processing times can be restricted to a minimum as a dependency of the pressure. As a result of the pressure-dependent controlling and/or regulating, it is also possible for the quantity of steam blown in to be reduced to the minimum amount necessary, and therefore also the energy input. In this situation, particularly advantageously, the method steps following directly after the filling phase, of the filling nozzle formed in the slider element being moved away and the actual closing of the container while still at the filling and closing unit, take place in a shortest possible process time.

According to one advantageous embodiment variant, provision can be made in this situation that, with the inclusion of at least one sensor, a control loop is formed by means of which at least the evacuation phase and/or the flushing phase and/or the handling phase are controlled and/or regulated as a dependency of the actual pressure values detected, wherein the filling valve and/or at least one of the first to the fifth control valves are provided as actuator elements in the control loop.

According to a further advantageous embodiment variant, provision can be made in this situation that, with the method, the evacuation phase and/or the flushing phase and/or the handling phase are controlled and/or regulated by means of preselectable pressure characteristics, with the integration of the control loop.

According to a further advantageous embodiment variant, provision can be made in this situation that, in the control loop, the actual pressure values detected by the pressure sensor are transferred to a machine control unit, and are compared there with stored pressure reference values, and, based on this, the filling valve and/or at least one of the first to fifth control valves can be actuated as an actuator element.

According to a further advantageous embodiment variant, provision can be made in this situation that reference pressure values are determined for the respective beginning and end of the evacuation phase and/or the flushing phase and/or the handling phase, which are then compared with the respective actual pressure values of the evacuation phase and/or the flushing phase and/or the handling phase being carried out at the present time, and, when the reference pressure values are reached, an immediate switchover takes place from the evacuation phase and/or the flushing phase and/or the handling phase presently being carried out, into the downstream phase, following that which is presently being carried out.

According to a further advantageous embodiment variant, provision can be made in this situation that, depending on the pressure, immediately after the reaching of a predetermined reference pressure value, a switchover takes place from the phase presently being carried out into the downstream phase in the filling and closing process, following the phase presently being carried out, and specifically dependent on the actual pressure values detected by the pressure sensor.

According to a further advantageous embodiment variant, provision can be made in this situation that the component parts subjected to steam in the filling and closing unit are made of a material with low thermal conductivity and/or thermal capacity.

According to a further advantageous embodiment variant, provision can be made in this situation that the container is pressed, in a sealed filling and closing position, by means of a carrier element, against a sealing element in a sealing position, which surrounds a dispensing opening for the liquid filling material, wherein the sealing element is arranged at a slider element, accommodated inside the process chamber and which can be displaced transversely to its vertical axis.

According to a further advantageous embodiment variant, provision can be made in this situation that a fluid channel is formed in the slider element, which, with the intermediate engagement of the filling valve, can be connected by means of a filling material line to a filling material tank.

According to a further advantageous embodiment variant, provision can be made in this situation that a gas channel is formed in the slider element, which can be brought into fluid connection by means of a first control valve as well as by means of a first feed line, and with the intermediate engagement of a third control valve, to an N2 source, by means of a fourth control valve to a steam source, and by means of a fifth control valve to a vacuum source.

According to a further advantageous embodiment variant, provision can be made in this situation for at least one temperature sensor to be located in the process chamber in order to detect the actual temperature values prevailing in the process chamber, which are regarded as controlled variables in the control loop.

"Containers" are understood in the meaning of the invention to be any type of container, in particular bottles, cans, beakers, etc., in each case made of metal, glass, or plastic, preferably of PET (polyethylene terephthalate).

The expression "substantially" or "approximately" signifies in the meaning of the invention deviations from the exact value in each case by +/−10%, preferably by +/−5%, and/or deviations in the form of changes which are not of significance to the function.

Further embodiments, advantages, and possible applications of the invention likewise derive from the following description of exemplary embodiments and from the Figures. In this situation, all the features described and/or illustrated are in principle the object of the invention, alone or in any desired combination, regardless of their relationships in the claims or references to them. The contents of the claims are also deemed to be constituent parts of the description.

The invention is described in greater detail hereinafter on the basis of the Figures in relation to exemplary embodiments.

DETAILED DESCRIPTION OF THE INVENTION

In the Figures identical reference numbers are used for elements of the invention which are the same or have the same effect. Moreover, for the sake of easier overview, only reference numbers are shown in the individual Figures which are required for the description of the respective Figure.

Figure 1:
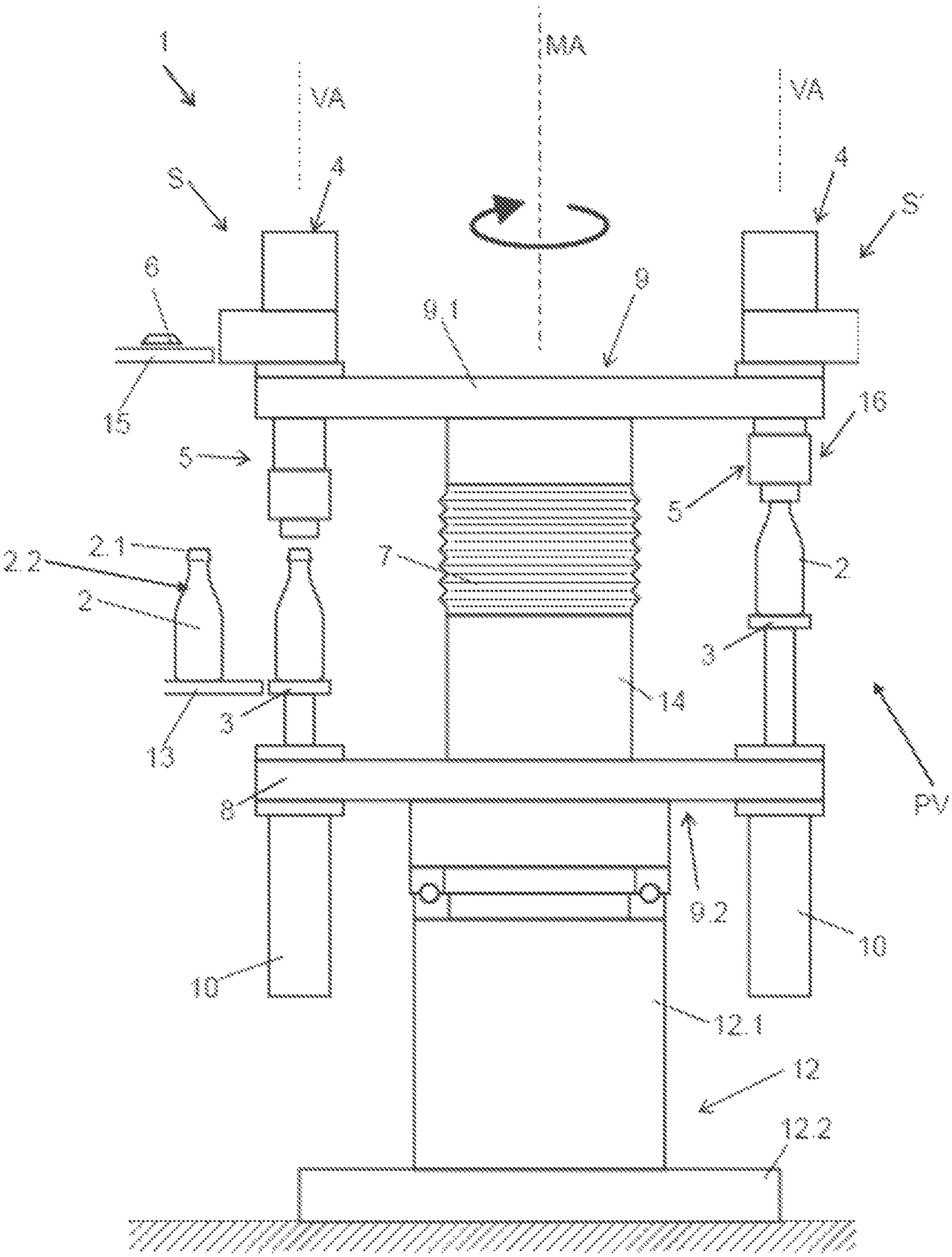
FIG. 1A rough schematic view of a preferred exemplary embodiment of the container handling system according to the invention, FIG. 2 an example of an embodiment variant of a filling and closing unit, FIG. 3 to FIG. 8 different phases of the filling and closing process in relation to the filling and closing process of the embodiment variant according to FIG. 2, and FIG. 9 in a highly simplified and rough schematic sketch, the mechanism for producing a closing process, on the basis of a handling station shown in isolation.

The container handling system designated in the Figures in general by 1, for filling and closing containers 2, is configured in this situation for carrying out the method according to the invention, and in the example represented according to FIG. 1 is configured as a container handling system or machine of a circulating type, wherein the machine is understood in the present case to be a container handling machine and in particular as a filling and closing machine 1, i.e. configured for the filling and closing of containers 2.

The container handling system 1, configured as a circulating filling and closing machine, comprises in this situation a plurality of handling stations S, S', arranged about a vertical middle axis MA, which in each case extend along a respective vertical axis VA, and are provided at the circumference of a motor-driven circulating machine carousel 9. For reasons of easier overview, in FIG. 1 in each case only two of the plurality of handling stations S, S' are represented. The present invention is not restricted to such embodiment forms, however.

Arranged at each handling station S, S' of the container handling system 1, in a carousel upper part 9.1 of the machine carousel 9, is in each case at least one filling and closing unit 4, which in each case likewise extends essentially in the direction along the vertical axis VA of the respective handling station S, S'.

The container handling system 1, configured as a circulating filling and closing machine, further comprises a carousel lower part 9.2, arranged in the vertical direction beneath the carousel upper part 9.1, which comprises a carrying rim 8, provided at the circumference of which are a plurality of carrier elements 3 for receiving and carrying the containers 2. In this situation, a carrier element 3 is assigned to each handling station S, S', such that each container 2 which is to be treated is mounted during the handling in a handling station S on a carrier element 3, assigned to this corresponding handling station S, S', in particular standing on the carrier element 3.

The container handling system 1, configured as a filling and closing machine, is configured and arranged in particular for the filling of containers 2 with a liquid filling material, as well as for the subsequent closing of the containers 2 with a closure cover 6, configured in the form of a crown cork, while still at the handling station S, S'. This present filling and closing machine 1 therefore functions, at least for the function sector of closing containers 2, namely for the closing function, as a crown cork applicator. It is not essential that the containers are closed with a crown cork, however. After the undertaking of the necessary adaptations, easily identifiable to the person skilled in the art, the containers can also be closed with screw closures or closure seals.

With a filling and closing machine 1 of this type, a container delivery device is usually provided, not represented in any greater detail in the Figures but located upstream in the direction of transport. For example, a further handling machine can also be located upstream, likewise not represented in the Figures, which is configured for further ongoing handling steps of the containers 2, such as for cleaning, sterilisation, drying, or inspection of the containers or the like.

The containers 2 are, as a rule, conveyed by means of transport devices, such as transport belts, to the filling and closing machine 1, and there transferred on the inlet side by transfer elements 13, indicated in FIG. 1 only in section and by way of implication, such as an inlet star, to the actual filling and closing machine 1. After running through the filling and closing machine 1, in the manner still to be described in detail hereinafter, i.e. after the filling and closing of the individual containers 2, the containers 2, closed with a closure cover 6, in particular a crown cork, are taken over on the outlet side of the filling and closing machine 1 by a further transfer element, not represented but provided downstream of the filling and closing machine 1 in the transport direction, such as an outlet star, and transported away in a manner known to the person skilled in the art, With the container handling system 1, configured as a filling and closing machine, in particular with the filling and closing units 4 provided at each handling station S, S', a filling material feed device (represented in FIG. 2 or 3) is connected for delivering the liquid filling material, as well as a closure cover feed device 15 for delivering the closure covers 6, configured as crown corks. For reasons of easier overview, the closure cover feed device 15, for delivering the individual crown corks 6, the delivery of which can take place in a known manner, is indicated in FIG. 1 only in schematic form and in a sectional view. The closure cover feed device 15 is configured in this situation for feeding to the filling and closing unit 4 an individual closure cover 6 for each container 2 which is to be filled and closed.

With the embodiment variant represented by way of example in FIG. 1 of the container handling system 1, configured as a filling and closing machine, in each case the machine carousel 9 is mounted such as to rotate above a central column 14, on a machine base 12, extending along the vertical machine axis MA, wherein the machine base 12 comprises in the present case, by way of example, a standing foot 12.1 and a machine foundation 12.2, connected to the standing foot 12.1 and mounted on the substrate.

In the exemplary configuration represented of the container handling system 1, configured as a filling and closing machine, arranged in the region of the central column 14 is a height adjustment device 7, by means of which the carousel upper part 9.1 and the carousel lower part 9.2 can be moved relative to one another in the vertical direction along the middle axis MA, in order to be able to adjust the container handling system 1 to different container formats, in particular to different heights of containers 2. In this situation, the height adjustment by means of the height adjustment device 7 and the adjustment of the machine carousel 9 to different container heights can be carried out in a manner well known to the person skilled in the art.

Each filling and closing unit 4 arranged at a respective handling station S, S' comprises at least one filling valve 4.1 (see also FIGS. 2 and 3) and at least one closing element 5, arranged in the vertical direction above the container 2 which is to be filled and closed, wherein, in particular during the closing process, the closing element 5 undertakes the function of a closure punch.

The filling and closing unit 4 can therefore also be understood to be a combined filling and closing tool, in particular as a combination tool, which comprises both the tool components required for filling as well as the tool components required for the closing of the containers 2. The filling valve 4.1 and the closing element 5, which in each case form a tool component for the filling or, respectively, a tool component for closing, are formed in particular as components integrated in the filling and closing unit 4. A possible embodiment of a filling and closing unit 4 configured as a combination tool of this kind is roughly sketched by way of example in FIGS. 2 and 3.

In this situation, provision can be made for the carrier element 3 and the closing element 5 to be arranged such as to carry out a controlled movement relative to one another oriented in the direction of the vertical axis VA of the handling station S, S', and specifically in such a way that the carrier element 3 and the closing element 5, based on the controlled relative movement, starting from an initial position, can adopt further positions relative to one another, namely at least one filling and closing position PV.

In the example from FIG. 1, the initial position is represented in each case for the handling station S, and the filling and closing position PV is sketched at the respective handling station S'. In particular, the container handling system 1 is configured both such as to fill the containers 2 at a respective handling station S, S', as well as to close them. In particular, in this situation, in the filling and closing position PV, at least one evacuation phase and/or a flushing phase and/or a filling phase and/or a handing phase downstream of the filling phase and later in time, are carried out, as well as the container 2 being closed in a closing process while still at the handling station S, S' with a closure cover 6. In particular, therefore, the container 2 must not be moved vertically during the preliminary handling in an evacuation and flushing phase, the actual filling phase, and the closing and sealing by means of a closure cover 6, since the respective container 2 can remain for all the part process steps referred to in the filling and closing position PV at the handling station S.

Figure 2:
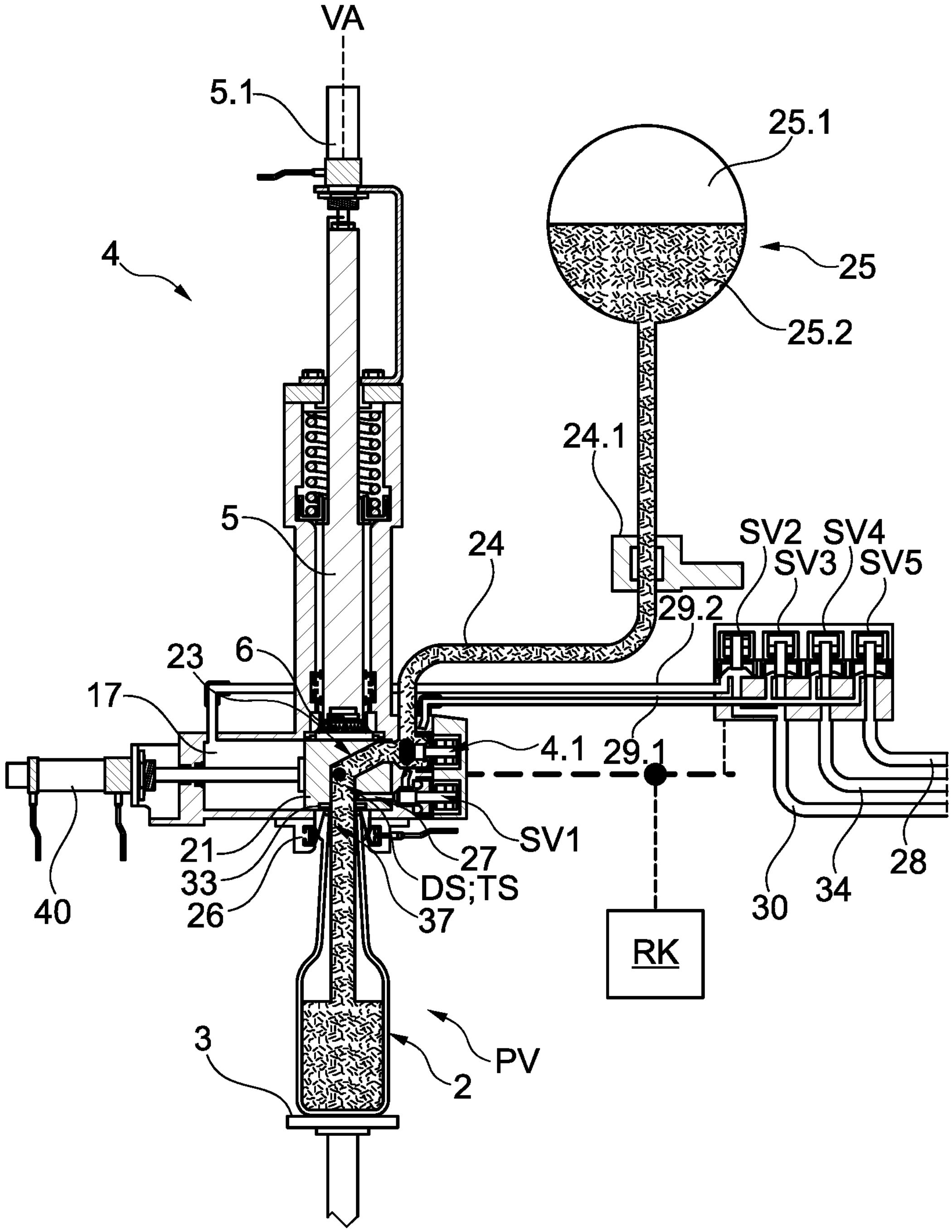

FIG. 2 shows by way of example a possible embodiment variant of a filling and closing unit 4 for use in the present container handling system 1, with which a container 2 which is to be treated, in particular filled and closed, can be moved for this purpose from the free and easily accessible under side of the filling and closing unit 4 into this element in such a way that at least the container mouth 2.1 of the container 2 can be arranged at a process chamber 17, but particularly advantageously inside the chamber. The process chamber 17 can be sealed against the outside atmosphere. At least the container mouth 2.1 remains inside the process chamber 17 during the entire filling and closing process, in particular during the evacuation phase and/or the flushing phase and/or the filling phase and/or the handling phase.

In particular in this situation, in the sealed filling and closing position PV shown in FIG. 2, the container 2 is preferably pressed against a sealing element 33 in the sealing position, by means of the carrier element 3, this (sealing element) concentrically enclosing a dispensing opening 37 for the liquid filling material. In this situation the sealing element 33 is arranged at a slider element 21, accommodated inside the process chamber 17 and able to be displaced in a controlled and/or regulated manner transverse to the vertical axis VA.

In this situation the slider element 21 can also comprise a fluid channel 23, which is connected to a fluid tank 25 via a filling material line 24, with the intermediate engagement of the filling valve 4.1. In this situation a flow meter 24.1 can be assigned to the filling material line 24, by means of which the volume flow can be detected of liquid filling material, the filling material quantity per time unit, delivered via the filling material line 24 from the filling material tank 25 to the fluid channel 23.

In addition to the fluid channel 23, the slider element 21 can also comprise a gas channel 27, which can be connected in a fluid transfer manner to an $N_2$ source 30 via a first control valve SV1 and via a first feed line 29.1, with the intermediate engagement of a third control valve SV3, to a steam source 34 by means of a fourth control valve SV4, and to a vacuum source 28 by means of a fifth control valve SV5.

Moreover, the process chamber 17 can be connected in a fluid transfer manner to the $N_2$ source 30 via a second feed line 29.2 and the intermediate engagement of a second control valve SV2 or of the third control valve SV3. In this situation, the $N_2$ source can be a nitrogen production device, which is configured such as to produce pure nitrogen with a 100% volume proportion from the ambient air.

In this situation, the sealable process chamber 17, preferably the fluid channel 23 of the slider element 21, comprises at least one pressure sensor DS for detecting the actual pressure values prevailing in the process chamber 17.

For this purpose, the at least one pressure sensor DS, together with the filling valve 4.1 and at least one of the control valves SV1 . . . SV5, forms a control loop RK, in particular a pressure control loop, by means of which at least the evacuation phase and/or the flushing phase and/or the handling phase can be controlled and/or regulated as a dependency of the actual pressure values detected, wherein the filling valve 4.1 and/or at least one of the control valves SV1 . . . SV5 are provided as actuators in the control loop RK, in particular in the pressure control loop.

In this situation, the sealable process chamber 17 can also comprise at least one temperature sensor TS for detecting the actual temperature values prevailing in the process chamber 17. For example, the at least one temperature sensor is arranged in the fluid channel 23 of the slider element 21. In this situation, the actual temperature values detected by means of the temperature sensor TS can be integrated as controlled variables into the regulating of the pressure control loop. In this situation, taking account in particular of a combination of the actual pressure values detected as well as of the actual temperature values detected, cooling and condensation effects in the container 2 can be compensated.

The slider element 21 can be displaced by means of a drive 40, for the filling phase, into a position beneath the closing element 5, i.e. essentially into a position along the vertical axis VA, in such a way that both the fluid channel 23 as well as the gas channel 27 of the slider element 21 are in firm contact and in a sealing position laterally at the filling valve 4.1 as well as at the first control valve SV1.

Furthermore, the slider element 21 can be drawn by means of the drive 40, for a closing procedure, laterally back out of the central position along the vertical axis VA (i.e. moved in a direction pointing horizontally away from the filling valve 4.1) in such a way that the closing element 5 can be freely displaced downwards, in the direction of the container 2 arranged in a sealing position at the filling and closing unit 4.

Figure 9:
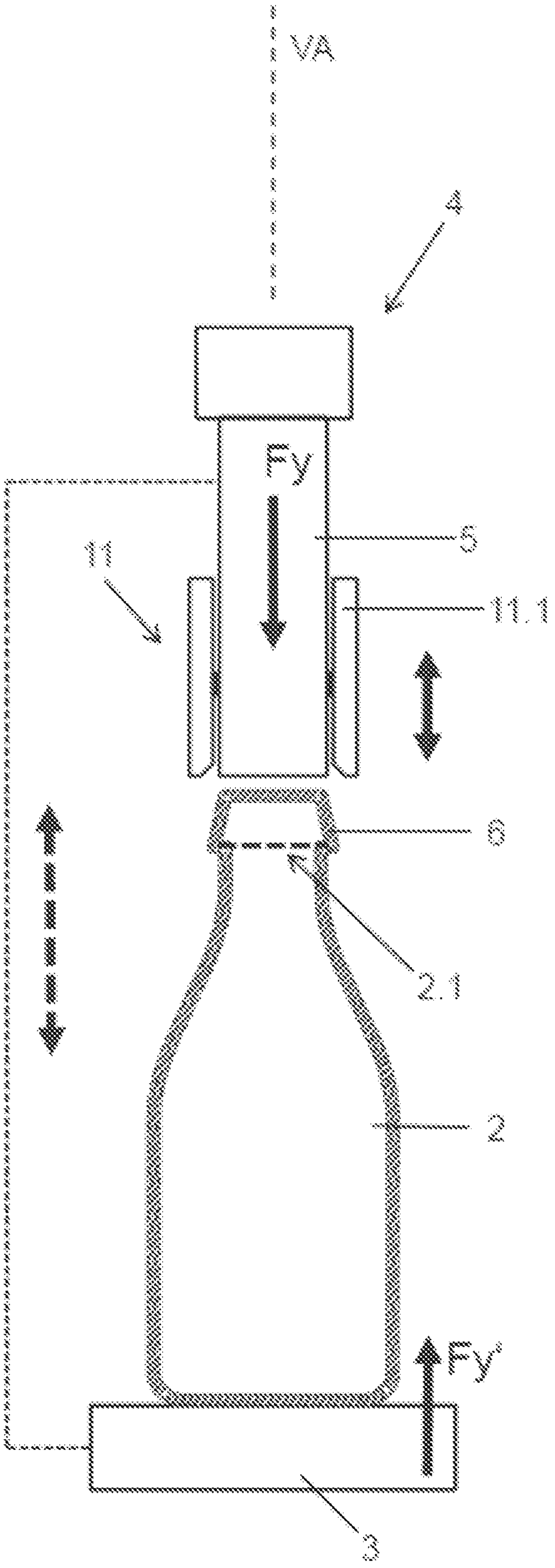

For a better understanding of the closing process or the closing phase of the filled container 2 with the closure cover 6, represented schematically once again in FIG. 9 is the interaction or the working mechanism between the carrier element 3 and the slider element 5 which can be moved vertically along the vertical axis VA.

Due to the controlled relative movement (indicated in FIG. 9 by the broken double arrow) of the carrier element 3 and of the closing element 5 relative to one another, the distance interval between the carrier element 3 and the closing element 5 can be changed in a controlled manner.

The container 2, filled and now to be closed, is arranged during the closing phase between the carrier element 3 and closing element 5, wherein at least the position of the closing element 5, during the carrying out of the different sequential function steps of "sealing", "filling", and "closing", also changes in relation to the container 2.

Due to the controlled relative movement, the contact pressure is produced between the crown cork 6 and container 2, which is required during the closing process. In this situation, the container 2, with the crown cork 6 positioned on the container mouth 2.1, is tensioned between the carrier element 3 and the closing element 5, wherein the closing element 5 transfers or exerts a closure force Fy from above onto the crown cork 6, and therefore also onto the container 2. The container 2 is held by the carrier element 3 with a holding force Fy' directed upwards and counteracting the closing force Fy, wherein the closing force Fy and the holding force Fy' take effect in interaction by pressing the crown cork 6 onto the container mouth 2.1 and then cause the sealed closure of the container 2.

As can be seen from FIG. 9, the carrier element 3 and/or the closing element 5 are configured as movable in a raising and lowering manner, and can therefore cover a movement path along the vertical axis VA. In order to initiate the vertical movement onto the closing element 5, this can interact with a drive device 5.1 in the region of a free face side facing away from the process chamber 17. In addition, the carrier element 3 and/or closing element 5 produce a force oriented along the vertical axis VA, namely the holding force Fy', taking effect vertically upwards, and, respectively, the closing force Fy, taking effect vertically downwards.

The plastic deformation of the edge of the crown cork, necessary for the final sealed tight closure of the container with the crown cork 6, takes place by an at least partial immersion of the crown cork 6 into the drawing ring 11.1 of the drawing ring arrangement 11.

For this purpose, the drawing ring 11.1 is configured as fixed in position, and the container is moved upwards relative to the drawing ring 11.1. As an alternative, the drawing ring 11.1 can be configured so as to be movable in the vertical direction, as a result of which it moves, for example, along the vertical axis VA relative to the non-moved crown cork 6 or to the container. The possible movement of the drawing ring 11.1 is indicated in FIG. 9 by the double arrow with the continuous line. As an alternative, both the drawing ring 11.1 as well as the carrier element 3 and the slider element 5 move.

In this situation, the closing element 5 can be configured in particular as a magnetic plunger, which at its free end facing towards the carrier element 3 magnetically holds the closure cover 6, in particular the crown cork, which is to be pressed onto the container mouth, before the closure cover 6 is fixed to the respective container 2 by means of the drawing ring assembly 11. As an alternative, the closing element 5 can also hold the closure cover 6 by the force effect of negative pressure.

Preferably, during the filling operation, an upper gas space 25.1 and a lower fluid space 25.2 are formed. If, in this situation, the container handling system 1 carries out pressure filling of the liquid filling material into the containers 2, the upper gas space 25.1 is subjected to an inert gas (CO2 gas) which is under filling pressure. The pressure of the inert gas is controlled or regulated. The filling material is delivered to the filling material tank 25 via a supply line, not represented in any greater detail.

Furthermore, a neck sealing device 26 is provided beneath the dispensing opening 37, which can be actuated in a controlled and/or regulated manner, by means of which the respective container 2 can be sealed beneath its container mouth 2.1 in the region of its corresponding container neck 2.2, and, as a result of which, in particular, the process chamber 17 is sealed against the surrounding environment when in the sealed filling and closing position PV. Since the container mouth 2.1, in the sealed filling and closing position PV, is therefore arranged at or at least partially inside the process chamber 17, this can also be understood as a sealing of the container 2.

For this purpose, with the method according to the invention, for the filling and closing of the containers 2 at the filling and closing unit 4 of the handling station S, S', and before the initiating of a filling phase, at least the interior of the container 2, arranged in the sealing position of the process chamber 17 of the filling and closing unit 4, is first evacuated in an evacuation phase, at least once, to a negative pressure of preferably 0.05 to 0.15 residual pressure, and then, in a flushing phase, flushed with steam and/or with a flushing gas containing steam, in such a way that, before the opening of the filling valve 4.1 for the filling of the container 2 with the liquid filling material, the flushing gas pressure in the container 2 is increased, i.e. raised, at least to atmospheric pressure.

Next, in the actual filling phase, the filling valve 4.1 is opened, such that the liquid filling material flows into the container 2, which continues to be arranged in the sealing position at the filling and closing unit 4.

After the ending of the filling phase, a further handling or treatment phase is carried out, still at the filling and closing unit 4 of the handling station S, during which the process chamber 17 is pre-loaded or subjected, in particular above the container mouth 2.1 of the container 2, by means of nitrogen ($N_2$) to a pressure which corresponds to the saturation pressure of the $CO_2$ contained in the filling material or lies above it. The handing phase is therefore provided for in particular at a time after the filling phase.

Provision can also be made for the process chamber 17 to be subjected to a mixture of nitrogen and atmospheric air up to a pressure which corresponds to the saturation pressure of the $CO_2$ contained in the filling material or lies above it.

Following this in turn, after the handling or treatment phase, the container 2, still at the filling and closing unit 4 of the handling station S, is closed by a closure cover 6 being pressed on under the pressure conditions adjusted and set during the handling phase, before the inner pressure of the process chamber 17 is relaxed to atmospheric pressure.

Advantageously, in this situation at least the evacuation phase and/or the flushing phase and/or the handling phase can be controlled and/or regulated as a dependency of the actual pressure values detected by the pressure sensor DS.

For this purpose, the at least one pressure sensor DS, together with the filling valve 4.1 and at least one of the control valves SV1 . . . SV3, forms a control loop RK, in particular a pressure control loop, by means of which at least the evacuation phase and/or the flushing phase and/or the handling phase can be controlled and/or regulated as a dependency of the actual pressure values detected, wherein the filling valve 4.1 and/or at least one of the control valves SV1 . . . SV5 are provided as actuators in the control loop RK, in particular in the pressure control loop.

According to one advantageous embodiment variant, provision is made in this situation for the container handling system 1 to be configured such as to control and/or regulate the evacuation phase and/or the flushing phase and/or the handling or treatment phase by means of preselectable pressure characteristics, with the integration of the control loop RK.

Preferably, for the control loop RK, the ACTUAL pressure values detected by the pressure sensor DS are transferred to the machine control unit, and compared with REFERENCE pressure deposited there, and, based on this, the filling valve 4.1 and/or at least one of the control valves SV1 . . . SV5 are themselves actuated as actuators. In this situation, the pressure sensor DS provides the regulating parameters of the controlled variables for the control loop RK.

In particular, provision can be made in this situation for reference pressure values to be set for the respective beginning and end of the evacuation phase and/or of the flushing phase and/or of the handling or treatment phase, which are compared with the respective ACTUAL pressure values of the evacuation phase and/or the flushing phase and/or the handling or treatment phase being carried out at the present moment, and, upon the reference pressure values being reached, an immediate switch is made from the corresponding presently conducted evacuation phase and/or flushing phase and/or handling or treatment phase to the phases which follow downstream of these.

In this situation, provision can be made in particular for the evacuation phase and/or the flushing phase to be carried out several times, and specifically by alternating switching back and forth between the evacuation phase and the flushing phase. In particular, provision can be made in this situation for nitrogen to be mixed into the flushing gas containing steam. Advantageously, in this situation nitrogen is mixed with the concluding process, i.e. the last flushing process before the initiation of the filling phase.

It is therefore ensured that, depending on the pressure, immediately after reaching a predetermined reference pressure value a switchover takes place from the phase presently being carried out to the phase following the present phase, downstream in the filling and closing process, and specifically dependent on the ACTUAL pressure values determined.

Figure 3:
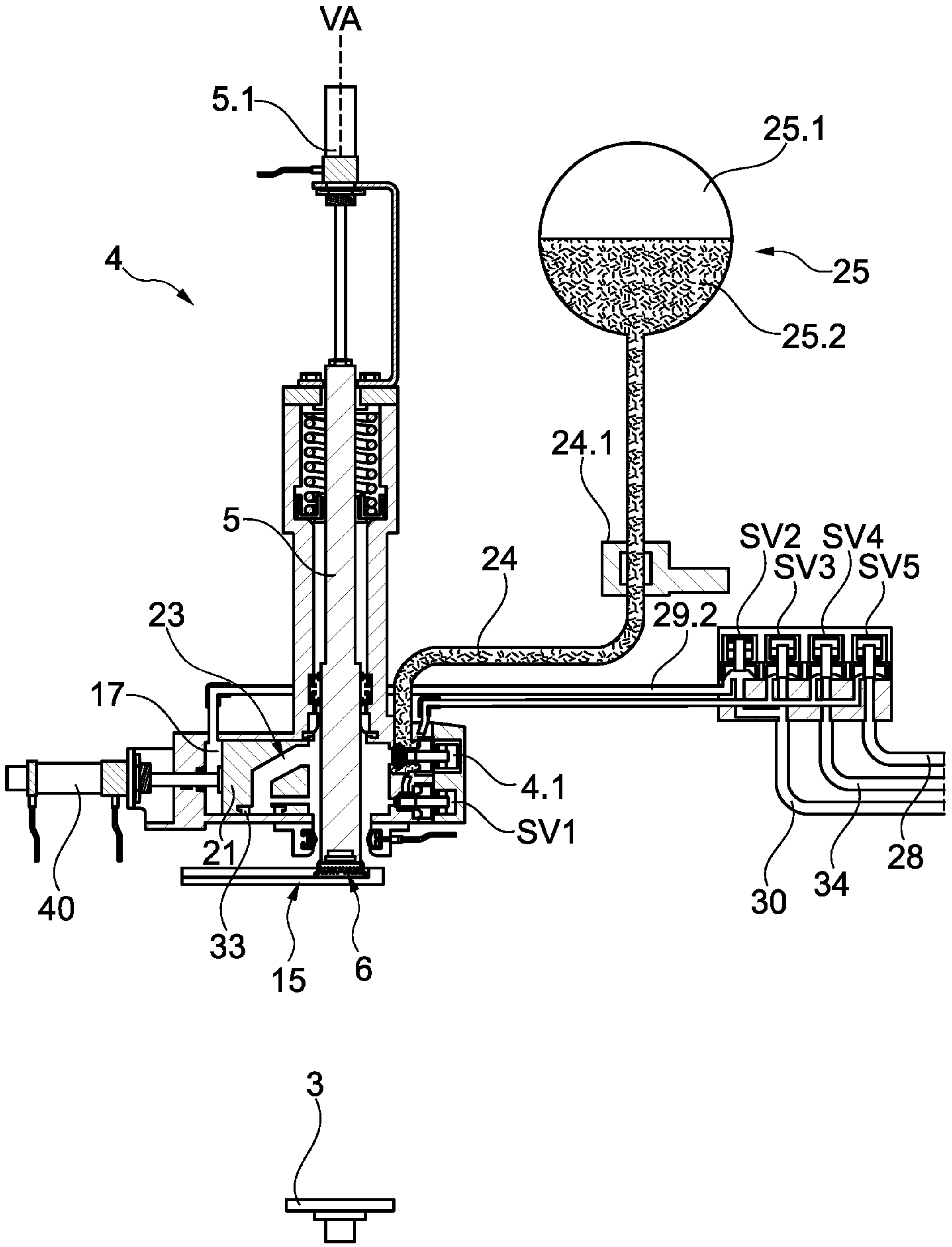

In greater detail, the method proceeds with a filling and closing unit 4 represented in FIG. 2 in the following manner:

As can be seen from FIG. 3, first the closing element 5 is moved into its lower position, for example for the magnetic reception of a closure cover 6.

For this purpose, the slider element 21 is located in its retracted position, in which the closing element 5 can be pushed out axially, and freely movably, along the vertical axis VA, downwards over the dispensing opening 37, in order in this way to receive the closure cover 6, and specifically from the closure cover feed 15. In this situation, the filling valve 4.1, and all the control valves SV1 . . . SV5 are closed. In particular, the closure cover 6 can in this situation be held magnetically at the closing element 5.

It is inherently understood that the sequences for closing the containers with other means than crown corks—see above—deviate from the sequence represented, but this does not lead to a departure from the scope of protection of the present invention.

The closure cover 6 is therefore sterilised before and during the closure process, with the steam treatment described in greater detail hereinafter.

Figure 4:
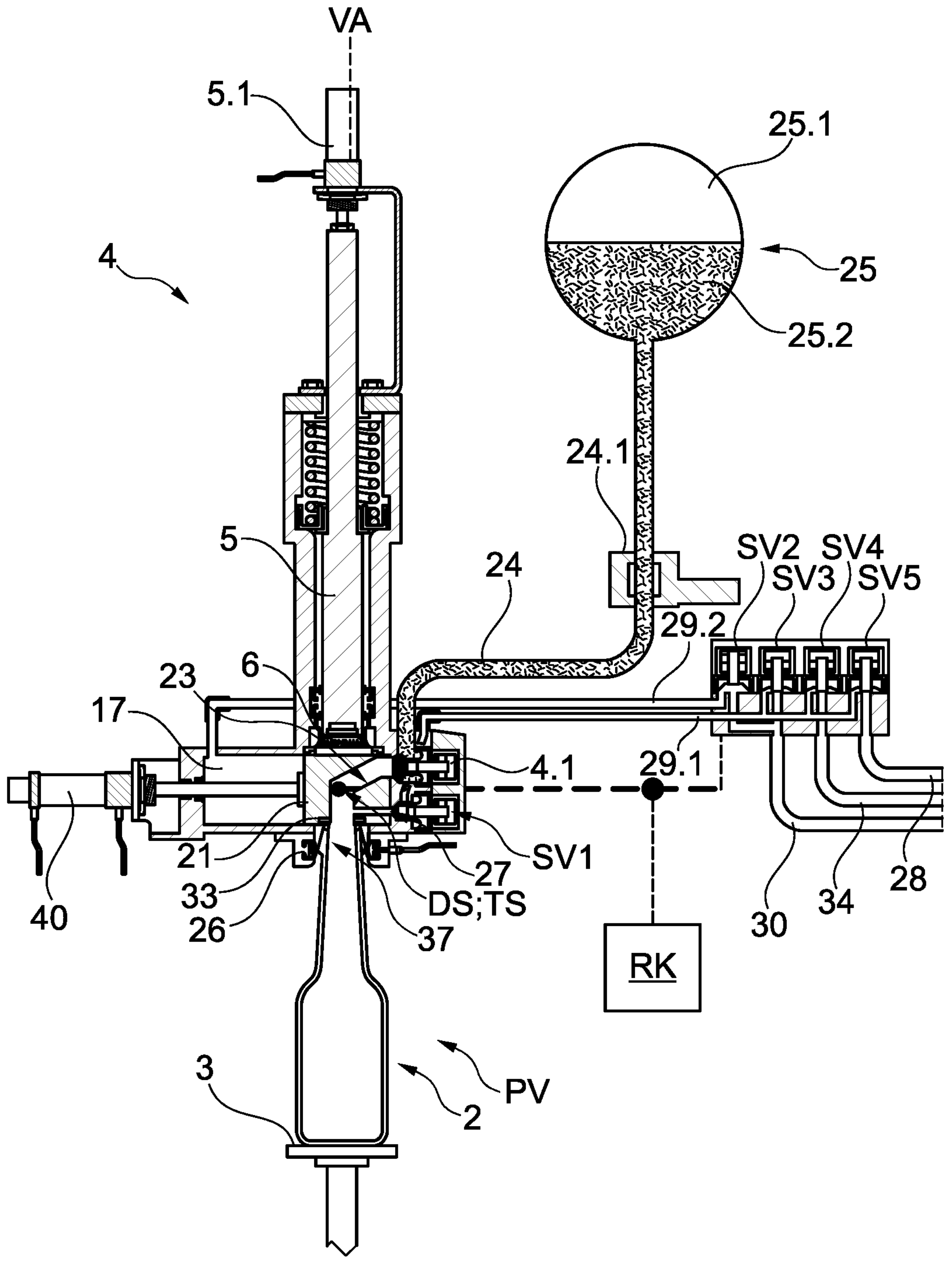

Next, the closing element 5, together with the closure cover 6 held to it, moves into its raised position. Next, the slider element 21 is moved under the closing element 5, in close contact against the filling valve 4.1 and the first control valve SV1. In addition, the container 2 is then positioned on the carrier element 3 centrally beneath the filling and closing unit 4, and, by raising the carrier element 3 into the sealing position with the process chamber 17 of the filling and closing unit 4, in particular with the slider element 21 (see FIG. 4).

Figure 5:
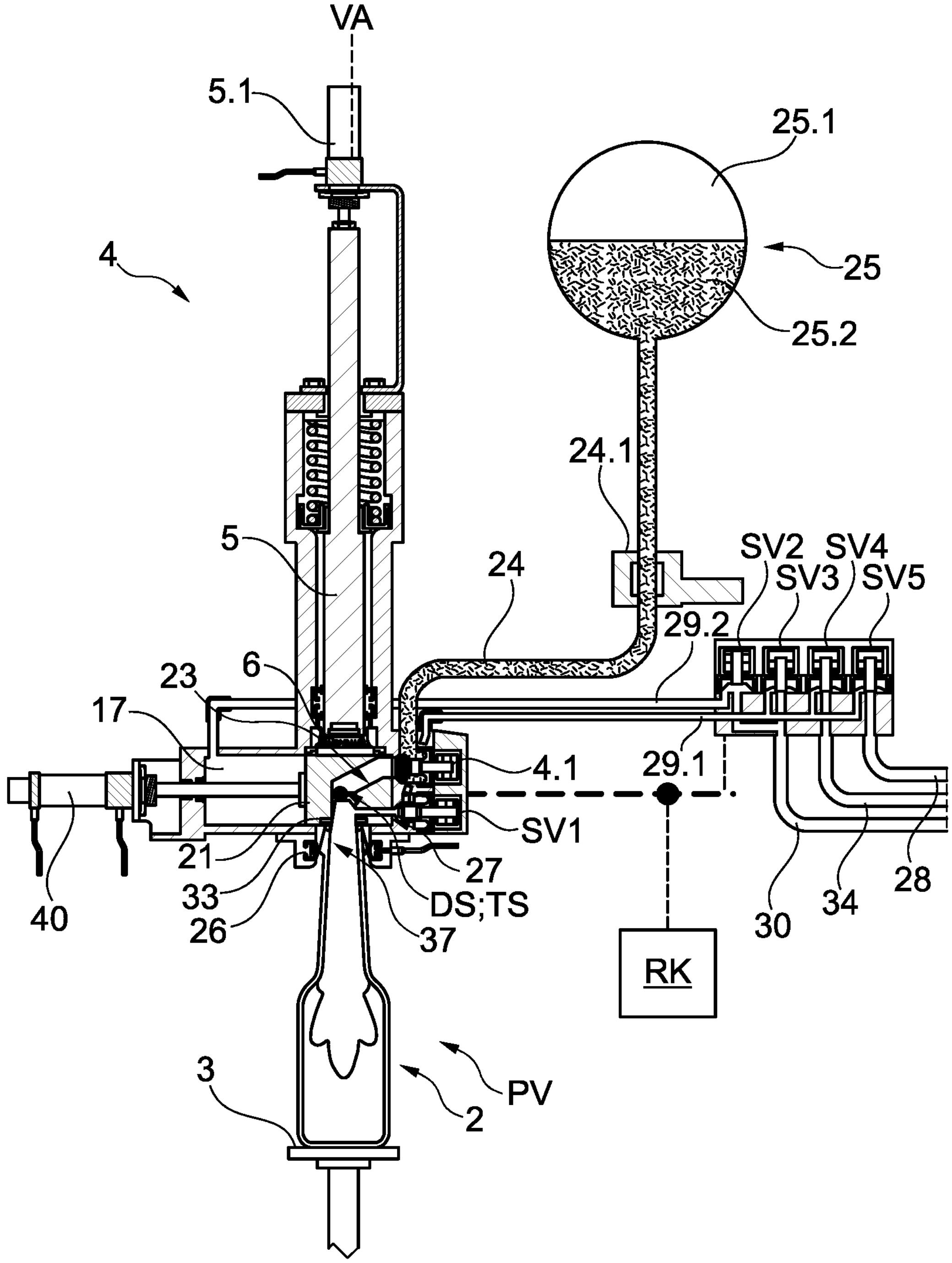

Next, the neck sealing device 26 is subjected to pressure, such that a sealing of the container 2 against the surroundings is produced in the region of its container neck 2.2 (see FIG. 5). Following this, in the present exemplary embodiment the container 2 is evacuated in the evacuation phase, by opening the first and fifth control valves SV1, SV5, to a value of preferably 0.05 to 0.15 bar as a reference pressure value. In this situation, the determination of the actual pressure values takes place by means of the pressure sensor DS, which provides these values for the control loop RK.

Next, with the first control valve SV1 continuing to be open, the fifth control valve SV5 is closed, and, in this situation, simultaneously or close to simultaneously, the fourth control valve SV4 is briefly opened in order to initiate the flushing phase, and specifically pressure-controlled by the control loop RK, until a pressure rise to at least atmospheric pressure takes place in the container 2, such that the container is flushed with steam from the steam line 34. These process steps are repeated for as long as required until the required O2 reduction is attained in the interior of the container 2. In this situation, therefore, the initiation takes place of the flushing and/or evacuation phase, preferably pressure controlled and/or pressure regulated, as a dependency of the actual pressure values detected by the pressure sensor DS. To conclude this handling or treatment phase, the container is preferably completely filled with steam.

Figure 6:
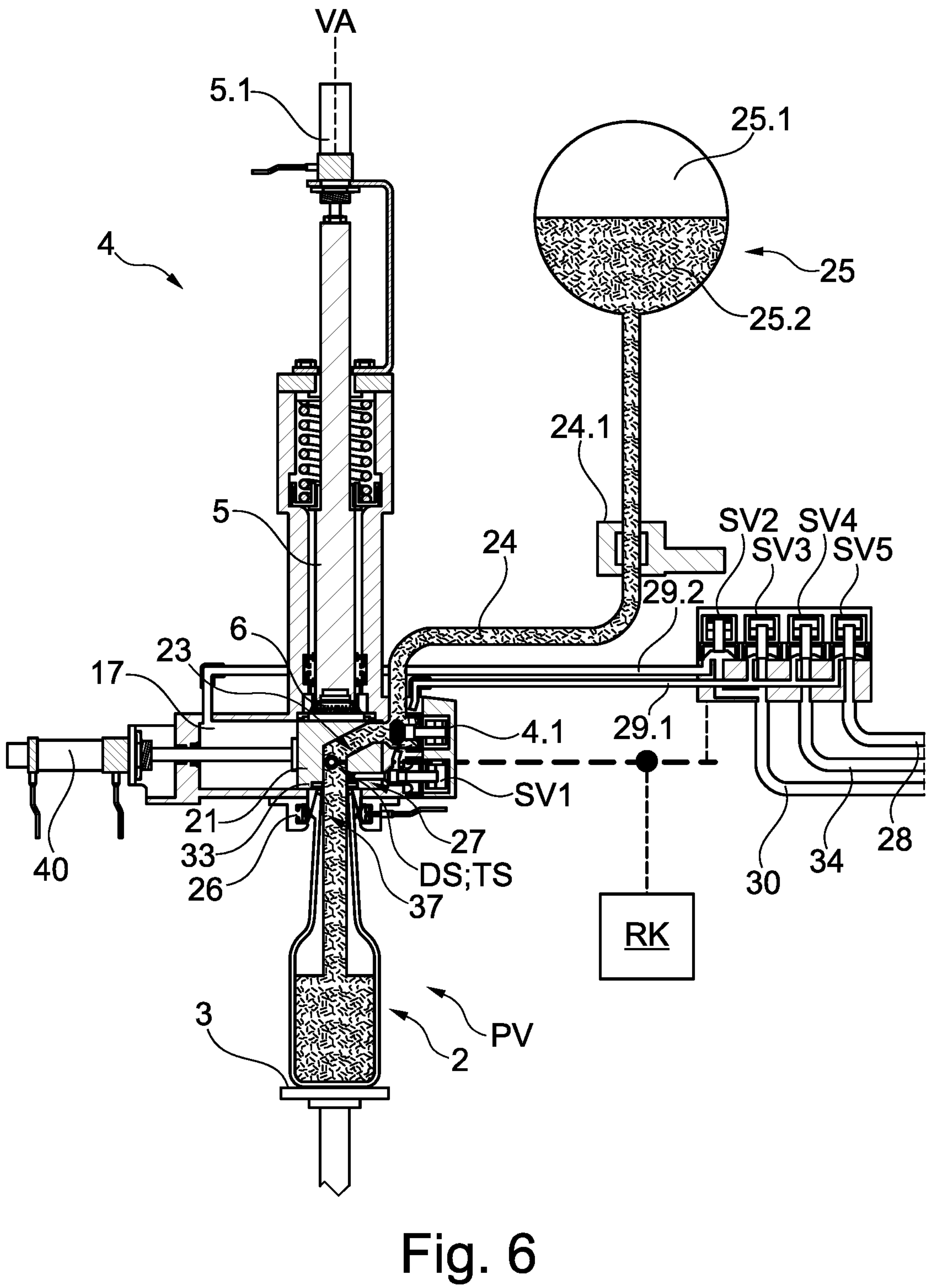

As can be seen from FIG. 6, in order now to initiate the filling phase, the first control valve SV1 and the fourth control valve SV4 are closed, and the filling valve 4.1 is opened, in order to deliver the filling material to the container 2. After the ending of the filling process, the filling valve 4.1 is closed again, wherein the quantity of the filling material delivered is detected by the volumetric flow meter 24.1. As an alternative to this, however, the product can also be delivered very rapidly from a metering space. In this case, the volumetric measurement takes place at the delivery of the filling material into the metering space and not in the filling element 4.

After the closing of the filling valve 4.1, the settlement phase sets in, in which the beverage settles and the pressure in the container 2 rises above the $CO_2$ saturation pressure.

Figure 7:
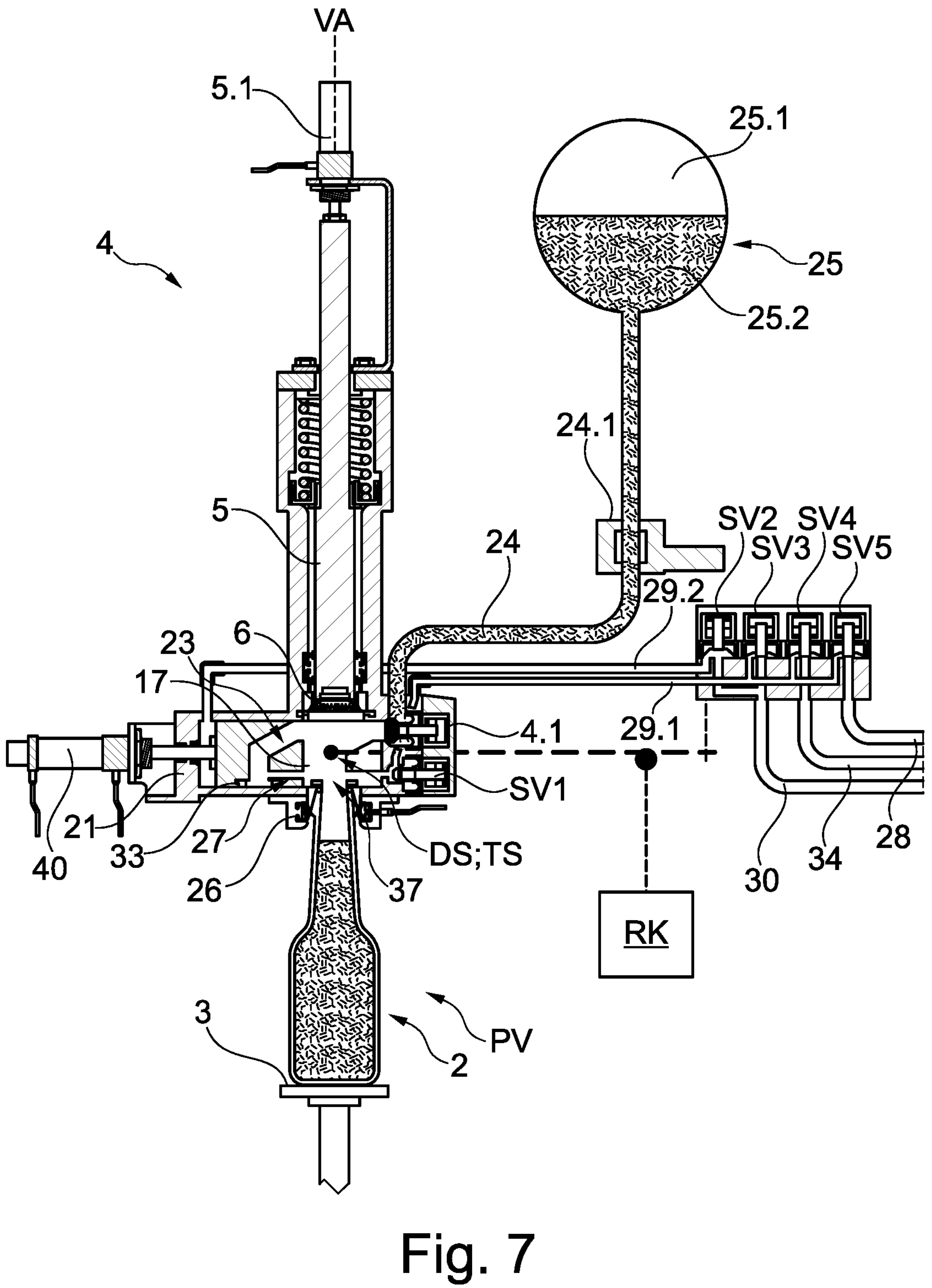

For the pre-loading of the pressure chamber 17 with nitrogen ($N_2$) after the filling phase, the second control valve SV2 is opened, in order to impose nitrogen on the process chamber 17 from the $N_2$ source 30, until a pressure has been set which is at the saturation pressure of the $CO_2$ contained in the filling material or lies above it. Preferably, the handling or treatment phase takes place in a pressure-controlled and/or regulated manner as a dependency of the actual pressure values detected by the pressure sensor DS. Further, the first and third control valve SV1, SV3, such that a pressure compensation takes place between the container 2 and process chamber 17. Before the slider element 21 is pushed back again, in this situation the third control valve SV3 is closed, while the first and second control valves SV1, SV2 continue to remain open (see FIG. 7).

Following this, the second control valve SV2 is also closed, while the first control valve SV1 remains open, and the closer element 5, with the closure cover 6 held to it, is placed onto the container mouth 2.1, and, by way of the procedure explained heretofore in connection with FIG. 9, is next pressed onto the container 2 with the necessary force, and then, by plastic deformation of the edge of the closure cover 6, is connected to the container with a tight seal.

Figure 8:
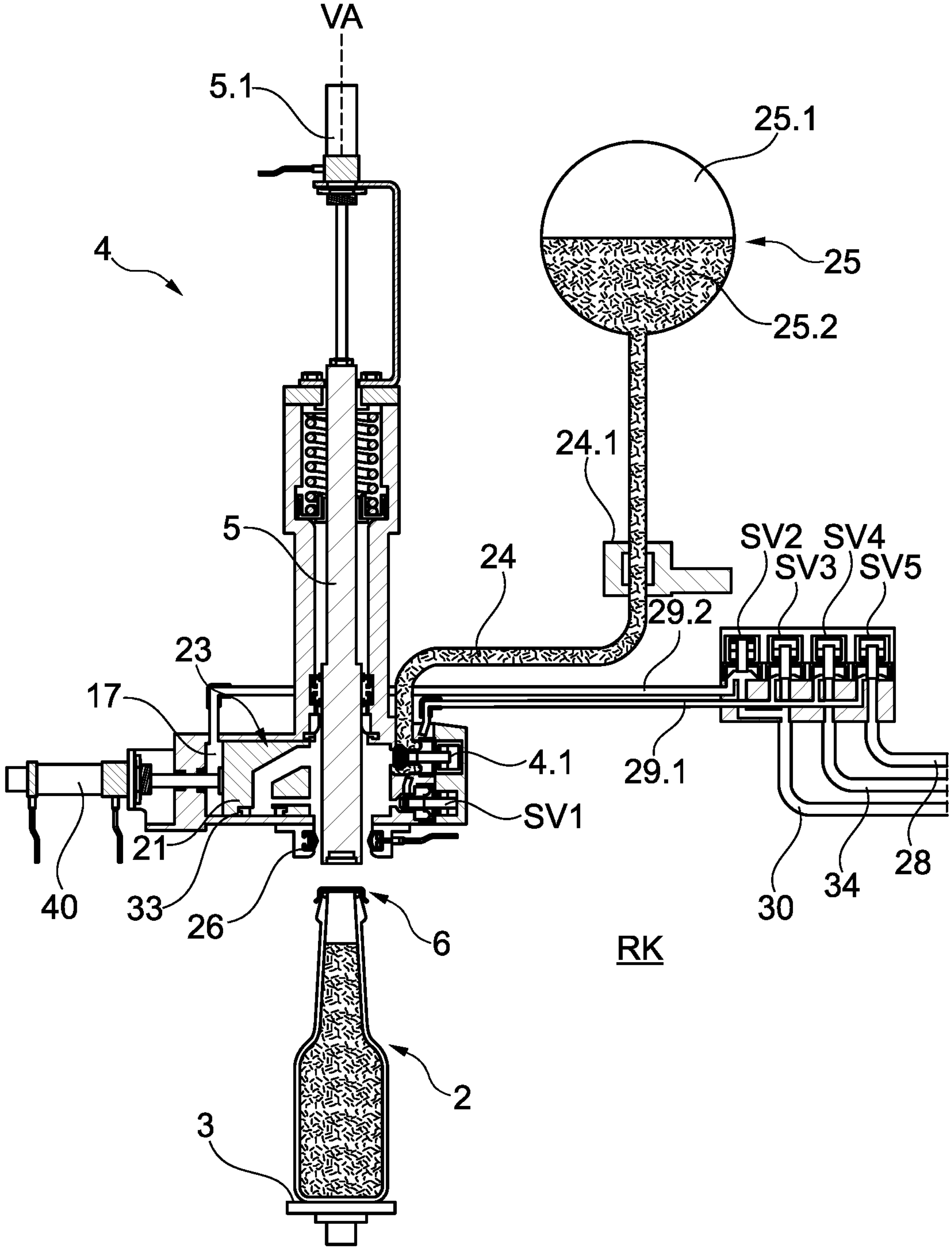

Finally, with the first control valve SV1 continuing to remain open, the container 2 is relieved of pressure and lowered downwards by means of the carrier element 3 (see FIG. 8).

The invention has been described heretofore in reference to exemplary embodiments. It is understood that a large number of changes or derivations are possible without thereby departing from the scope of protection of the invention defined by the claims. The contents of the claims are deemed to be the object of the description.

REFERENCE NUMBER LIST

1 Container handling device
2 Container
2.1 Container mouth
2.2 Container neck
3 Carrier element
4 Filling and closing unit
4.1 Filling valve
5 Closing element
6 Closure cover
7 Height adjustment device
8 Carrying rim
9 Machine carousel
9.1 Carousel upper part
9.2 Carousel lower part
11 Drawing ring assembly
11.1 Drawing ring
12 Machine base
12.1 Standing foot
12.2 Machine foundation
13 Transfer element
14 Central column
15 Closure cover feed device
17 Process chamber
21 Slider element
23 Fluid channel
24 Filling material line
24.1 Flow meter
25 Filling material tank
25.1 Gas chamber
25.2 Fluid chamber
26 Neck sealing device
27 Gas channel
28 Vacuum source
29.1 Feed line
29.2 Feed line
30 N2 source
33 Sealing element
34 Steam source
37 Dispensing opening
Fy Closure force
Fy' Holding force
DS Pressure sensor
TS Temperature sensor
MA Middle axis
PV Filling and closing position
RK Control loop
VA Vertical axis
S Handling station
SV1 . . . SV5 First to fifth control valves

The invention claimed is:

1. A method for filling and closing containers at a filling and closing unit of a handling station, the method comprising:

connecting a container mouth of a corresponding container with a pressure-tight connection to a process chamber of the filling and closing unit;

prior to initiating a filling phase, first evacuating an interior of the container, arranged in a sealing position at the process chamber, in an evacuation phase at least once to a negative pressure and, in at least one subsequent flushing phase, flushing the container with steam and/or flushing gas containing steam such that, prior to opening a filling valve for filling the container with a liquid filling material, a flushing gas pressure in the container is raised at least to atmospheric pressure;

in the filling phase, opening the filling valve to allow the liquid filling material to flow into the container, while the container remains in the sealing position at the filling and closing unit;

subsequent to the filling phase, carrying out a handling or treatment phase at the filling and closing unit of the handling station, by pressurizing the process chamber with nitrogen to a pressure at or above a saturation pressure of $CO_2$ contained in the filling material filled into the container;

subsequent to the handling or treatment phase, closing the container, while the container remains at the filling and closing unit of the handling station, by pressing on a closure cover under the pressure circumstances adjusted and set during the handling phase; and subsequently relieving an internal pressure of the process chamber to atmospheric pressure and to thereby release the pressure-tight connection of the container mouth of the corresponding container.

2. The method according to claim 1, which comprises:

in the evacuation phase, evacuating the container to a negative pressure of 0.05 to 0.15 bar residual pressure; and in the handling phase, pressurizing the process chamber above the container mouth of the corresponding container.

3. The method according to claim 1, which comprises subjecting the process chamber to a mixture of nitrogen and atmospheric air up to a pressure which lies at or above the $CO_2$ saturation pressure of the filled filling material, or subjecting the process chamber to pure nitrogen up to a pressure which lies at or above the saturation pressure of the $CO_2$ contained in the filling material to be filled into the container.

4. The method according to claim 1, which comprises carrying out at least one of the evacuation phase or the flushing phase a plurality of times, and alternatingly switching back and forth between the evacuation phase and the flushing phase.

5. The method according to claim 1, which comprises mixing nitrogen into the flushing gas containing steam of the flushing phase.

6. The method according to claim 5, which comprises mixing nitrogen into the flushing gas containing steam of the flushing phase for an ultimate flushing phase just prior to initiating the filling phase.

7. The method according to claim 1, which comprises controlling at least one of the evacuation phase, the flushing phase, the filling phase, or the handling or treatment phase by open-loop and/or closed-loop control in dependence on actual pressure values detected inside the process chamber by way of at least one pressure sensor.

8. The method according to claim 1, which comprises integrating at least one pressure sensor for sensing actual pressure values in the process chamber to form a control loop for controlling at least one of the evacuation phase, the flushing phase, or the handling or treatment phase by open-loop or closed-loop control in dependence of the actual pressure values detected, and integrating the filling valve and/or at least one of first to fifth control valves as actuators in the control loop.

9. The method according to claim 8, which comprises controlling at least one of the evacuation phase, the flushing phase, or the handling or treatment phase by closed-loop or open-loop control, by way of preselectable pressure characteristics, with the integration of the control loop.

10. The method according to claim 8, which comprises, in the control loop, transferring the actual pressure values detected by the pressure sensor to a machine control unit and comparing with reference pressure values stored in the machine control unit, and, based on a result of the comparison, actuating the filling valve and/or at least one of the first to fifth control valves as an actuator element.

11. The method according to claim 8, which comprises, for a respective start and end of the evacuation phase and/or the flushing phase and/or the handling or treatment phase, determining reference pressure values, comparing the reference pressure values with respective actual pressure values of the evacuation phase and/or flushing phase and/or handling or treatment phase that is presently being carried out, and, on reaching the reference pressure values, carrying out an immediate switchover out from the corresponding phase that is presently being carried out to a corresponding downstream phase or following phase.

12. The method according to claim 8, which comprises providing at least one temperature sensor in the process chamber for detecting actual temperature values prevailing in the process chamber, and taking the actual temperature values into account as controlled variables in the control loop.

13. The method according to claim 1, which comprises, immediately upon reaching a predetermined reference pressure value as detected by a pressure sensor, switching over from a phase in the filling and closing process that is presently being carried out into a phase following downstream of the present phase in a production flow.

14. The method according to claim 1, wherein component parts that are subjected to steam in the filling and closing unit are formed of a material with low thermal conductivity and/or thermal capacity.

15. The method according to claim 1, which comprises pressing the container, in a sealed filling and closing position thereof, by a carrier element against a sealing element in a sealing position, which concentrically surrounds a dispensing opening for the liquid filling material, wherein the sealing element is arranged at a slider element accommodated inside the process chamber and movable transversely to a vertical axis.

16. The method according to claim 15, wherein the slider element is formed with a liquid channel which, with an intermediate engagement of the filling valve, is connectible via a filling material line to a filling material tank.

17. The method according to claim 15, wherein the slider element is formed with a gas channel to be fluidically connected by way of a first control valve and by way of a first feed line, and with an intermediate engagement of a third control valve, to a nitrogen source, by way of a fourth control valve to a steam source, and by way of a fifth control valve to a vacuum source.

* * * * *